Patented Sept. 6, 1932

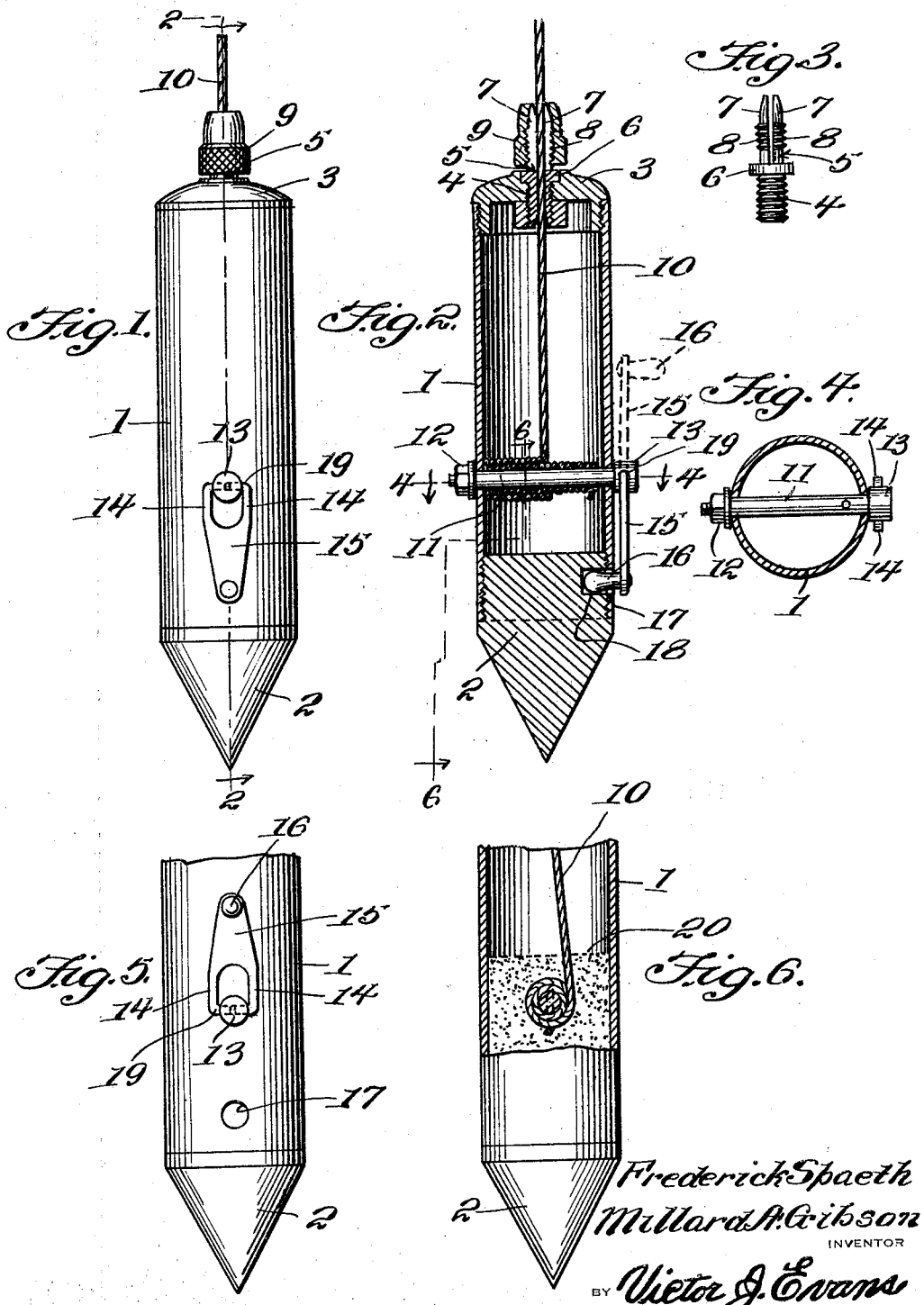

1,876,473

UNITED STATES PATENT OFFICE

FREDERICK C. SPAETH, OF WILLIAMSPORT, AND MILLARD A. GIBSON, OF LOCKHAVEN, PENNSYLVANIA; SAID SPAETH ASSIGNOR TO SAID GIBSON

PLUMB BOB AND CHALK LINE

Application filed March 12, 1930. Serial No. 435,238.

An object of the present invention is the provision of a hollow plumb bob and chalk line having a shaft upon which the plumb line is wound, and a handle of a particular and peculiar construction connected with the shaft for turning the same to wind or unwind the line on the shaft and to likewise lock the line to the plumb bob when the same has been wound or unwound for a predetermined and desired distance.

A further object is the provision of a plumb bob and chalk line that comprises a body member in the nature of a shell, a head and a point, together with a transverse shaft upon which one end of the plumb line is fixed, guide means for the plumb line through the head, a swingable handle on the shaft for turning the latter, and said handle having a knob end that is received through the body shell and into the point at its connection with the body shell for locking the shaft from turning and for likewise preventing the accidental displacement of the point from the body.

It is a further important object to provide a hollow plumb bob that serves as a chalk receptacle and which has trained therethrough and wound around a shaft therein a line, together with a handle for operating the shaft, the said handle being swingable to lock the shaft from movement and whereby the line, in its travel through the plumb bob will be effectively chalked.

To the attainment of the foregoing the improvement resides in the construction, combination and operative association of parts, one satisfactory embodiment of which is disclosed by the accompanying drawing.

In the drawing:

Figure 1 is a side elevation of the improvement.

Figure 2 is a sectional view approximately on the line 2—2 of Figure 1.

Figure 3 is an elevation of the combined clutch and guide for the plumb line.

Figure 4 is a sectional view on the line 4—4 of Figure 2.

Figure 5 is a fragmentary elevation showing the handle swung to operative position.

Figure 6 is a detail sectional view approximately on the line 6—6 of Figure 2.

The body of the improved plumb bob, is in the nature of a metallic shell 1. This shell has screwed in its outer end the reduced end portion of the weighted point 2. Screwed in the opposite end of the shell there is the threaded flange of a head member 3. The head is centrally formed with a threaded opening, and in this opening there is screwed the tubular body portion 4 of a plumb line guide 5. The body merges into a head 6 that is seated in a depression in the outer face of the head, and from the said head the body merges into split spring clutch fingers 7 provided for a portion of their length with threads 8. The fingers have their outer faces arranged angularly or slightly curved and the said fingers are designed to be received in the bore of a nut member 9 which is screwed in the threads 8. By adjusting the nut member 9 the fingers may be brought toward or away from each other to either clutch or disengage therefrom the plumb line 10. The plumb line has one of its ends fixed in a shaft 11 which is journaled transversely through the body 1. The shaft preferably has one of its ends reduced and threaded and has screwed thereon a nut 12, and the second end of the shaft is enlarged to form the same with a head 13. The head is provided with a transverse opening for the reception of inwardly directed fingers on the arms 14 provided at the bifurcated end of a handle 15. The handle has an outstanding operating knob 16.

With a device as above described it will be noted that the plumb line 10 may be readily wound or unwound from the shaft 11 by merely turning the handle 15 and likewise by adjusting the nut 9 the clutch fingers 7 will frictionally engage with the line to prevent the free movement of the plumb bob thereon. As a matter-of-fact, the nut may be adjusted to cause the fingers to engage with the plumb line with sufficient friction as to prevent the movement of the plumb bob on the line.

The shell body 1, at its connection with the reduced and threaded end of the point 2 is provided with a round opening 17 that registers with a notch 18 in the point 2. When the handle has been turned to arrange the plumb bob at a desired position on the plumb line 10, the handle is swung on its pivots 19 and the knob 16 thereof is brought through the opening 17 and into the notch 18. It will be noted that the shaft 11 is effectively held from turning and that the point 2 is locked on the hollow body or shell 1 so that danger of its accidental disassociation from the body is thus prevented.

The hollow body or shell 1 is designed to provide a receptacle for powdered chalk, so that the plumb line 10 will be chalked in its travel through the said body and thereby be effectively employed for marking a line on a surface. The chalk in the body is indicated by the numeral 20.

The illustration and foregoing description pertains to one satisfactory embodiment of the improvement and it is to be understood that such changes and modifications may be made therefrom as fairly fall within the scope of what is claimed.

Having described the invention, what is claimed is:

1. A plumb bob comprising a cylindrical body shell, a point having a reduced end screwed in one end of the shell, a head having a central threaded opening and a threaded extension screwed in the second end of the shell, a headed guide sleeve screwed through the opening in the head, a nut screwed on the sleeve and contacting with the inner face of the head, said sleeve having divided clutch fingers extending from the outer end thereof, the outer faces of the fingers being tapered and inward of such tapered portions being threaded, a nut having one end of its bore tapered and non-threaded and said nut being screwed on the threaded portions of the fingers for compressing a plumb line between the fingers when the same is passed through the sleeve guide, a transversely arranged shaft to which the inner end of the plumb line is connected the shell having openings in which the shaft is journaled, a swingable handle on the shaft, having an outstanding operating knob and said shell having an opening therethrough, and the threaded end of the point having a notch in a line with said opening and said opening and notch designed to receive therein the knob end of the handle for holding the shaft from turning and for preventing the accidental disassociation of the shell and point.

2. A plumb bob comprising a hollow body having a reduced end, a removable closure closing the other end, a plumb line reeling device disposed within the body, the closure being provided with an opening therethrough, a guide sleeve having one end reduced and threaded and extending through said opening, a nut engaging said threaded end and adapted to be screwed against said closure to hold the guide sleeve therein, said guide sleeve having at the other end a circular series of fingers combining to define a guide opening in continuation of the bore of the sleeve, and a nut threadingly engageable with the sleeve in surrounding relation to the fingers, the latter and the bore of the nut being correspondingly tapered, so that movement of the nut axially in one direction of the sleeve will serve to deflect the fingers radially inwardly for compression on a plumb line passing through the guide.

In testimony whereof we affix our signatures.

FREDERICK C. SPAETH.
MILLARD A. GIBSON.